(12) United States Patent
Underwood et al.

(10) Patent No.: US 7,144,155 B2
(45) Date of Patent: Dec. 5, 2006

(54) METHOD, SYSTEM AND APPARATUS FOR MEASURING TEMPERATURE WITH COLD JUNCTION COMPENSATION

(75) Inventors: William Barry Underwood, Tamworth (GB); Christopher Charles Weston, Barlestone (GB); Harbanse Deogan, Leicester (GB); Roderick Gordon Brown, Mapperley Park (GB)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 10/924,067

(22) Filed: Aug. 23, 2004

(65) Prior Publication Data
US 2005/0047479 A1   Mar. 3, 2005

(30) Foreign Application Priority Data
Aug. 27, 2003   (GB) ................................. 0320083.9

(51) Int. Cl.
*G01K 7/13* (2006.01)
(52) U.S. Cl. .......................................... 374/181; 33/172
(58) Field of Classification Search ................ 374/172, 374/179–182
See application file for complete search history.

(56) References Cited

U.S. PATENT DOCUMENTS

| | | | | |
|---|---|---|---|---|
| 4,488,824 A | | 12/1984 | Salem ......................... | 374/181 |
| 4,623,266 A | * | 11/1986 | Kielb .......................... | 374/181 |
| 4,718,777 A | * | 1/1988 | Mydynski et al. ........... | 374/181 |
| 4,776,706 A | | 10/1988 | Loiterman et al. .......... | 374/208 |
| 4,936,690 A | * | 6/1990 | Goetzinger .................. | 374/181 |
| 5,088,835 A | * | 2/1992 | Shigezawa et al. .......... | 374/181 |
| 5,167,519 A | * | 12/1992 | Jones et al. .................. | 374/181 |
| 5,246,293 A | | 9/1993 | Luotsinen et al. ........... | 374/181 |
| 5,492,482 A | * | 2/1996 | Lockman et al. ............ | 136/235 |
| 5,579,244 A | | 11/1996 | Brown ......................... | 700/301 |
| 6,068,400 A | * | 5/2000 | Nelson et al. ............... | 374/179 |
| 6,293,700 B1 | * | 9/2001 | Lund et al. .................. | 374/181 |

FOREIGN PATENT DOCUMENTS

| | | |
|---|---|---|
| EP | 0686835 | 12/1995 |
| GB | 2 187 051 A | 2/1987 |

OTHER PUBLICATIONS

Japan Abstract Publication No. 57175230 dated Oct. 28, 1982.
EP Search Report for Application No. 04 25 5146 dated Nov. 2, 2004.
Monger, Ray, "Thermocouple Cold Junction Compensation For Portable Instruments", Control and Instrumentation., vol. 10, No. 8, 1978: 35-37.

* cited by examiner

*Primary Examiner*—G. Bradley Bennett
(74) *Attorney, Agent, or Firm*—Cantor Colburn LLP

(57) ABSTRACT

A cold junction compensation system for a temperature measurement device having a processing circuit is disclosed. The cold junction compensation system includes a cold junction temperature sensor arranged in signal communication with the processing circuit, a thermal coupler in thermal communication with the cold junction temperature sensor, and first and second contacts each in thermal communication with the thermal coupler and in electrical isolation with each other, each contact arranged for signal communication with the processing circuit and arranged for signal communication with a hot junction temperature sensor. A signal from the hot junction temperature sensor is communicated to the processing circuit via the first and second contacts, the cold junction temperature sensor senses the cold junction temperature at the first and second contacts via the thermal coupler, and a signal representative of the cold junction temperature is communicated to the processing circuit for enabling a cold junction compensation calculation.

17 Claims, 3 Drawing Sheets

METHOD, SYSTEM AND APPARATUS FOR MEASURING TEMPERATURE WITH COLD JUNCTION COMPENSATION

CROSS REFERENCE TO RELATED APPLICATIONS

This application claims the benefit of a priority under 35 U.S.C. 119 to Great Britain Patent Application No. GB 0320083.9 filed Aug. 27, 2003, the entire contents of which are hereby incorporated by reference.

BACKGROUND OF THE INVENTION

The present disclosure relates generally to a temperature measurement device, and particularly to a cold junction compensation system for a temperature measurement device.

Temperature measurement devices, also referred to as temperature indicator or calibration devices, are available that operate by receiving a signal from a thermocouple and converting that signal into a temperature reading. The thermocouple signal is representative of the temperature at the thermocouple junction, referred to as the hot junction. Thermocouples operate according to the Seebeck effect (thermoelectric potential), where current is produced in a closed circuit of two dissimilar metals if the hot and cold junctions, the cold junction is also referred to as the reference junction, are maintained at different temperatures. The voltage between the hot and cold junctions is proportional to the temperature difference between the hot and cold junctions. Thermocouples may be made from a variety of materials, such as iron, constantan, copper, and tin, for example. The type and gauge size of the material used for the thermocouple is typically classified by a letter code, such as T, L, and K, for example, which typically have different voltage-temperature characteristics. Accordingly, temperature measurement devices designed for working with multiple types of thermocouple wires include a means for accommodating the different voltage-temperature characteristics.

When a measuring system is constructed using a thermocouple, one junction, the hot junction, is located at the position where the temperature is to be measured, but a spurious second junction, the cold junction, is inevitably formed where the dissimilar material wires are terminated at the measuring instrument. Since the cold junction, having thermocouple wires and contacts of different materials, is electrically connected in series with the hot junction and the temperature measurement device, an additional thermoelectric potential is introduced at the cold junction that is seen by the temperature measurement device. For instrument accuracy, this cold junction potential needs to be compensated for, which is referred to as cold junction compensation. Some cold junction compensation methods involve the use of large cold junction contacts, which produce a large thermal inertia to equalize the thermal response rate of the cold junction and the cold junction temperature sensor. However, contacts of such a large mass are undesirable for lightweight hand-held devices. Other cold junction compensation methods involve the use of thermally conductive and electrically insulative material such as silicon grease or brittle mica for conducting heat from the cold junction contacts to the cold junction temperature sensor. However, such heat conducting materials are undesirable for rapid assembly and mass production methods. Yet other cold junction compensation methods involve the use of a lookup table that is calibrated to provide an offset voltage for a given thermocouple wire type at a predefined temperature, such a zero degree-Celsius for example. However, such lookup table methods are impractical for lightweight hand held devices not having a cold junction temperature maintained at zero degree-Celsius. Accordingly, there is a need in the art for a temperature measurement device that overcomes these drawbacks.

SUMMARY OF THE INVENTION

In one embodiment, a cold junction compensation system for a temperature measurement device having a processing circuit is disclosed. The cold junction compensation system includes a cold junction temperature sensor arranged in signal communication with the processing circuit, a thermal coupler in thermal communication with the cold junction temperature sensor, and first and second contacts each in thermal communication with the thermal coupler and in electrical isolation with each other, each contact arranged for signal communication with the processing circuit and arranged for signal communication with a hot junction temperature sensor. A signal from the hot junction temperature sensor is communicated to the processing circuit via the first and second contacts, the cold junction temperature sensor senses the cold junction temperature at the first and second contacts via the thermal coupler, and a signal representative of the cold junction temperature is communicated to the processing circuit for enabling a cold junction compensation calculation.

In another embodiment, a temperature measurement device having a processing circuit employs a method for compensating for the measurement error introduced by a cold junction. A signal from a hot junction temperature sensor is communicated to the processing circuit via a pair of contacts that define a cold junction, the temperature of the cold junction is communicated to a temperature sensor via an elastomeric thermal coupler, and a signal representative of the cold junction temperature is communicated from the temperature sensor to the processing circuit. The processing circuit is adapted for receiving and analyzing the signals from the pair of contacts and from the temperature sensor to provide a cold junction compensated temperature reading.

In a further embodiment, a temperature measurement device includes a housing, a processing circuit, an input and output interface, and a cold junction compensation system. The cold junction compensation system includes a cold junction temperature sensor arranged in signal communication with the processing circuit, a thermal coupler in thermal communication with the cold junction temperature sensor, and first and second contacts each in thermal communication with the thermal coupler and in electrical isolation with each other, each contact arranged for signal communication with the processing circuit and arranged for signal communication with a hot junction temperature sensor. A signal from the hot junction temperature sensor is communicated to the processing circuit via the first and second contacts, the cold junction temperature sensor senses the cold junction temperature at the first and second contacts via the thermal coupler, and a signal representative of the cold junction temperature is communicated to the processing circuit for enabling a cold junction compensation calculation.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a cold junction compensation system for a temperature measurement instrument, such as a hand-held portable temperature indicator, for example. While the exemplary embodiment described herein depicts a defined number of thermocouple connection ports for interfacing with the cold junction compensation system, it will be appreciated that the disclosed invention is also applicable to a temperature measurement instrument having single or multiple thermocouple connection ports for interfacing with single or multiple cold junction compensation systems.

Figure 1:
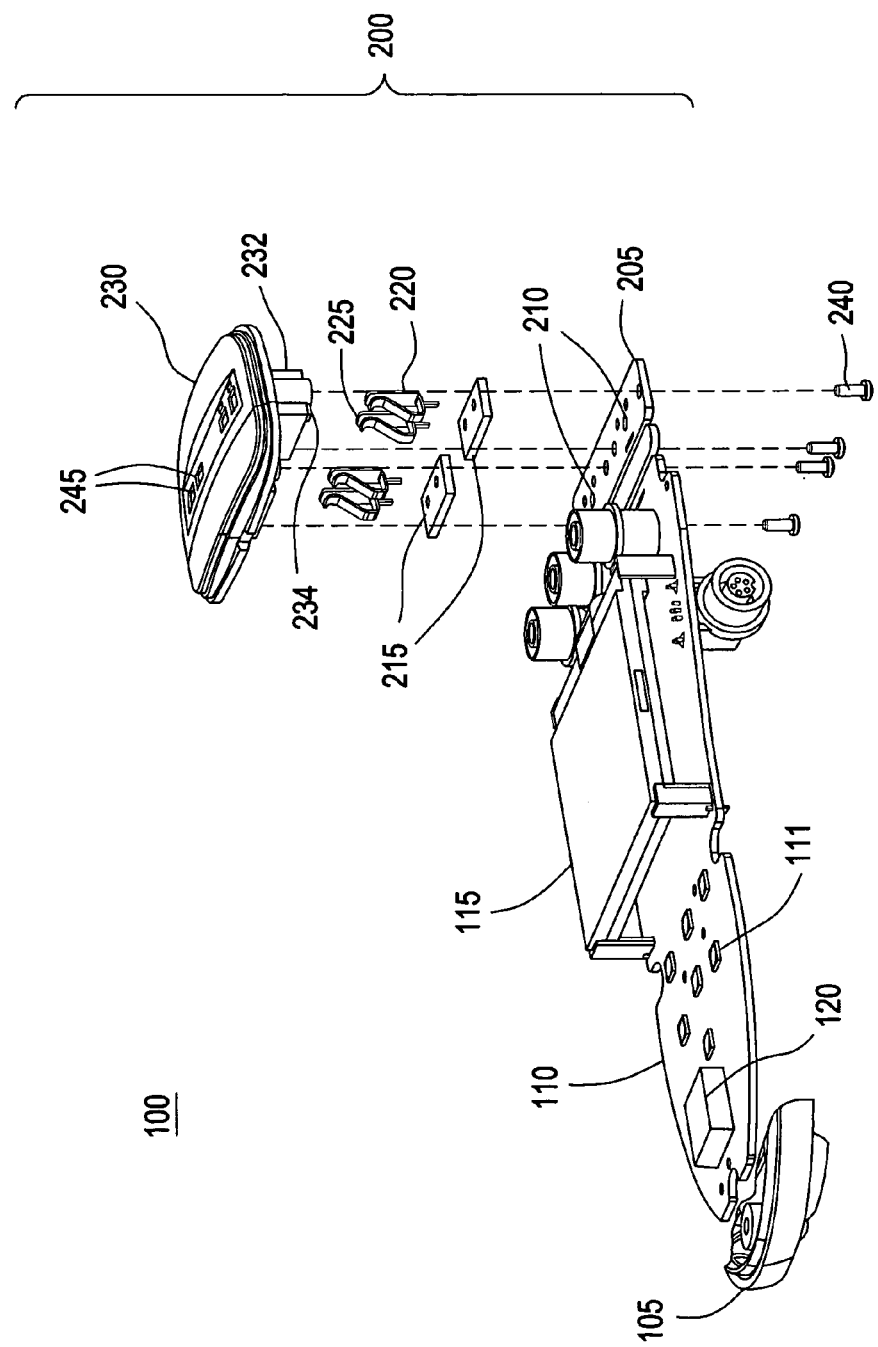
FIG. 1 depicts an exploded isometric view of an exemplary temperature measurement device in accordance with an embodiment of the invention.

FIG. 1 is an exemplary embodiment of temperature measurement device 100 having a housing 105, depicted in partial view for clarity, a processing circuit 110, an input and output interface 115, a power supply 120, and a cold junction compensation (CJC) system 200. Processing circuit 110 includes sufficient electronic components 111 known in the art, including a processor and a memory for example (collectively depicted at 111), for receiving temperature sensor signals and user inputs, calculating temperature compensation factors, and displaying temperature information. Processing circuit 110 may be a printed circuit board (PCB) having wire runs for signal communication among and between the various components of temperature measurement device 100.

In an embodiment, CJC system 200 includes a substrate 205, such as a PCB for example, a cold junction (CJ) temperature sensor 210 supported by substrate 205 and arranged for signal communication with processing circuit 110 (discussed further below), such as a commercial off the shelf (COTS) temperature sensor for example, a thermal coupler 215 in thermal communication with CJ temperature sensor 210, a first and a second contact 220, 225 in thermal communication with thermal coupler 215, and a cover 230. In an embodiment, thermal coupler 215 is an elastomeric material having thermally conductive properties and electrically resistive properties. Suitable materials for thermal coupler 215 may include silicone sheet or room temperature vulcanizing rubber, for example. Other suitable materials may include a variety of potting compounds, such as epoxy for example, or commercially available seals, such as O-rings for example. Further alternative materials suitable for the purpose herein disclosed and taught, including materials with additives for improving the thermal and electrical properties, may become evident to one skilled in the art upon further review of the teachings of the instant invention. Thermal coupler 215 serves to equalize the temperatures of first and second contacts 220, 225, which enables accurate calculation of the cold junction compensation, and to communicate the temperature of first and second contacts 220, 225 to CJ temperature sensor 210.

Figure 2:
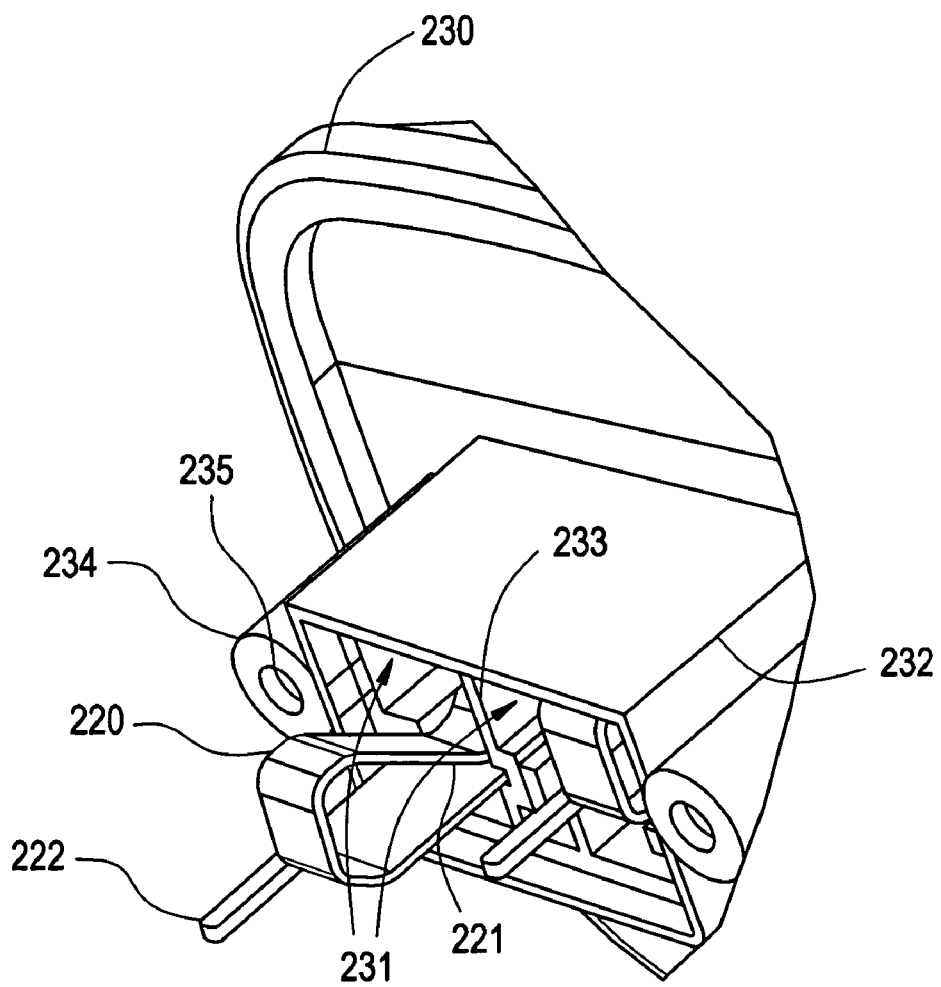
FIG. 2 depicts an enlarged isometric view of a portion of FIG. 1 from a different perspective.

In an embodiment, first and second contacts 220, 225 are formed from flat blanks that are sheared, in a stamping die for example, and formed, in a forming die for example, to provide a spring clip connection 221 at one end and a pin 222 for connecting to substrate 205 at the other end, best seen by now referring to FIG. 2. In an embodiment, contacts 220, 225 are each made to be lightweight, such as equal to or less than about 1 gram (gm), and preferably equal to or less than about 0.5 gm, for example. Lightweight contacts 220, 225 have the advantage of quickly responding to the cold junction temperature changes, which can be quickly communicated to CJ temperature sensor 210 in a manner disclosed herein. In an embodiment, first and second contacts 220, 225 have a thermal time constant of equal to or less than about one minute. As used herein, the term thermal time constant refers to the time it takes for the temperature at first and second contacts 220, 225 to reach approximately 63.3 percent of their steady-state value. By having lightweight contacts 220, 225, in addition to other lightweight components, CJC system 200 may be readily implemented into a lightweight temperature measurement device 100. As depicted in FIGS. 1 and 2, contacts 220, 225 fit into recesses 231 formed into cover 230. Recesses 231 have sidewalls 232 for retaining contacts 220, 225, and a separation wall 233 formed thereat for providing electrical isolation between first contact 220 and second contact 225. Cylindrical ribs 234 have central holes 235 for receiving screws 240 for securing cover 230 to substrate 205 with thermal coupler 215 disposed therebetween. Cover 230 also includes ports 245 for receiving a connector (not shown) connected to an external hot junction temperature sensor, such as a thermocouple for example.

While FIG. 1 depicts CJC system 200 having one substrate 205, two CJ temperature sensors 210, two thermal couplers 215, two pairs of contacts 220, 225, one cover 230, and two pairs of ports 245, for communicating with two thermocouple connectors 261 (depicted in FIG. 4), it will be appreciated that CJC system 200 may be configured for communicating with any number of thermocouple connectors 261, however, for clarity, reference is made herein to only signal path from one thermocouple connector 261 through one CJC system 200.

Figure 3:
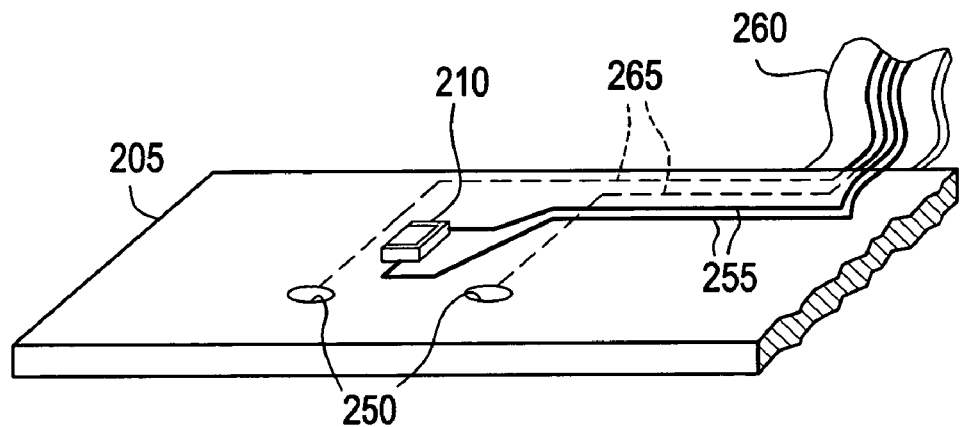
FIG. 3 depicts an enlarged isometric view of another portion of FIG. 1 from a different perspective.

Referring now to FIG. 3, which depicts an enlarged view of exemplary substrate 205 with CJ temperature sensor 210 disposed thereat, holes 250 are formed in substrate 205 for receiving pins 222 of contacts 220, 225, with one pin of each connector fitting into each hole 250 and being soldered thereat. Wire runs 255 on one side of substrate 205 provide signal communication from CJ temperature sensor 210 to processing circuit 110 via a flexible conductor 260, such as a flexible wire ribbon for example. Wire runs 265 on the other side of substrate 205 (shown in dotted line fashion) provide signal communication from the external thermocouple connector 261, best seen in FIG. 4, to processing circuit 110 via contacts 220, 225, soldered holes 250, and flexible conductor 260. CJ temperature sensor 210, which is in thermal communication and electrical isolation with contacts 220, 225, senses the cold junction temperature defined by contacts 220, 225 via thermal coupler 215, and communicates a signal representative of the cold junction temperature to processing circuit 110, thereby providing information for a cold junction compensation calculation.

Figure 4:
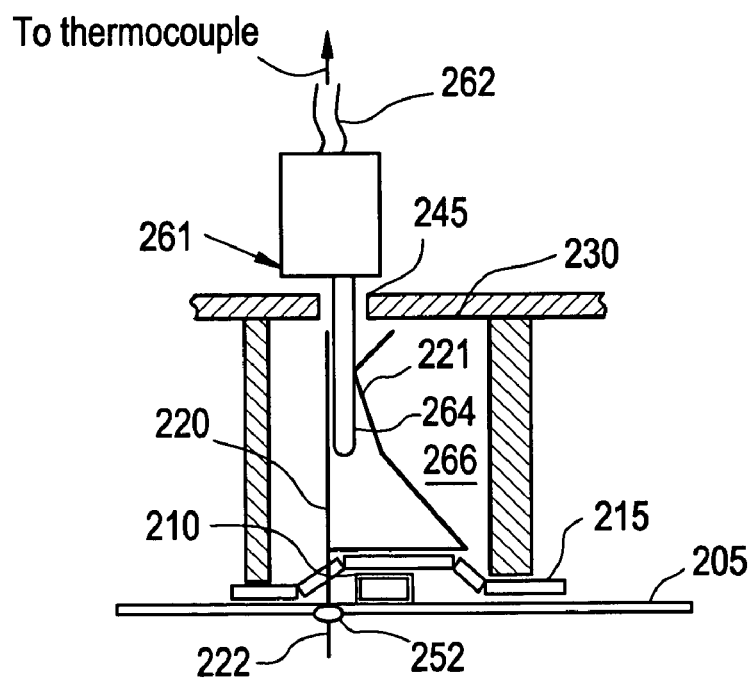
FIG. 4 depicts a cross-section side view taken through a portion of FIG. 1.

Referring now to FIG. 4, which depicts a side view of a section cut through cover 230 at ports 245, thermocouple connector 261, having thermocouple wires 262 receptive of a signal representative of the hot junction temperature, is in signal communication with spring clip 221 of contact 220 via pin 264. Each thermocouple connector 261 has two pins 264 (only one shown in the side view of FIG. 4), with each pin 264 connecting to one of the two thermocouple wires 262. Pin 222 of each contact 220, 225 is soldered 252 to substrate 205 at each hole 250. In an embodiment, CJ temperature sensor 210 is enclosed between substrate 205 and thermal coupler 215, which may be accomplished by side walls 232 of cover 230 extending down to press thermal coupler 215 against substrate 205 around the perimeter of CJ temperature sensor 210, thereby sealing CJ temperature sensor 210 from ambient 266. The sealing of thermal coupler 215 to substrate 205 may be enhanced by the use of an adhesive layer disposed between the two. By sealing CJ temperature sensor 210 from ambient 266, CJ temperature sensor 210 is less sensitive to the temperature of ambient 266 and more sensitive to temperature of the cold junction defined by contacts 220, 225, thereby improving the CJC analysis at processing circuit 110. In an embodiment, CJ temperature sensor 210 is centrally disposed between first and second contacts 220, 225 (as depicted in FIG. 3), thereby avoiding an imbalance in temperature sensing.

In view of the foregoing, temperature measurement device 100 receives at processing circuit 110 a thermocouple signal from thermocouple connector 261 and a CJ temperature signal from CJ temperature sensor 210, and applies a compensation algorithm to negate the influence of the CJ temperature from the actual temperature measured at the external thermocouple, thereby providing at output interface 115 a CJC temperature reading.

While an embodiment of the invention has been described employing an externally connected thermocouple, it will be appreciated that the scope of the invention is not so limited, and that the invention may also apply to a temperature measurement device having an extended probe with a self-contained thermocouple at the end.

As disclosed, some embodiments of the invention may include some of the following advantages: low cost and lightweight temperature measurement with cold junction compensation; compact device for temperature measurement; low thermal mass CJ contacts and good thermal communication between the CJ contacts and CJ temperature sensor for rapid response to CJ temperature variation; ingress protection to CJ temperature sensor in the absence of a connected thermocouple; reduced ambient influence at the CJ temperature sensor; and, a temperature measurement device conducive to high volume production.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A cold junction compensation system for a temperature measurement device having a processing circuit, the cold junction compensation system comprising:
    a cold junction temperature sensor arranged for signal communication with the processing circuit;
    a thermal coupler in thermal communication with the cold junction temperature sensor;
    a first and a second contact each in thermal communication with the thermal coupler and in electrical isolation with each other, each contact arranged for signal communication with the processing circuit and arranged for signal communication with a hot junction temperature sensor;
    a substrate for supporting the cold junction temperature sensor, the cold junction temperature sensor being disposed between the substrate and the thermal coupler, wherein a signal from the hot junction temperature sensor is communicated to the processing circuit via the first and second contacts, the cold junction temperature sensor senses the cold junction temperature at the first and second contacts via the thermal coupler, and a signal representative of the cold junction temperature is communicated to the processing circuit for enabling a cold junction compensation calculation.

2. The system of claim 1, wherein the thermal coupler comprises an elastomeric material having thermally conductive properties and electrically resistive properties.

3. The system of claim 1, wherein the first and second contacts each have a weight of equal to or less than about 1 gram.

4. The system of claim 1, wherein the thermal coupler comprises a potting compound having thermally conductive properties and electrically resistive properties.

5. The system of claim 1, wherein the substrate further comprises signal paths directed toward the processing circuit from both the cold junction temperature sensor and the first and second contacts.

6. The system of claim 1, wherein the thermal coupler provides a seal to enclose the cold junction temperature sensor between the thermal coupler and the substrate.

7. The system of claim 6, further comprising:
    a cover securely engaged with the substrate, the cover having recesses for receiving the first and second contacts and ports for receiving a hot junction temperature sensor connector.

8. The system of claim 7, wherein the cover further comprises a sidewall extending to and engaging with the thermal coupler, thereby compressing at least a portion of the thermal coupler against the substrate to form the seal.

9. The system of claim 1, wherein the cold junction temperature sensor is centrally disposed between the first and second contacts.

10. The system of claim 1, wherein the first and second contacts each comprise flat blanks that are sheared and formed to provide a hot junction temperature sensor connection at one end and a substrate connection at the other end.

11. The system of claim 1, wherein the first and second contacts have a thermal time constant of equal to or less than about one minute.

12. In a temperature measurement device having a processing circuit, a method for compensating for the measurement error introduced by a cold junction, the method comprising:
    communicating a signal from a hot junction temperature sensor to the processing circuit via a pair of contacts that define a cold junction, each contact having a weight equal to or less than about 1 gram, the contacts being in thermal communication with each other and electrically isolated from each other;
    communicating the temperature of the cold junction to a temperature sensor via an elastomeric thermal coupler, the elastomeric thermal coupler having thermally conductive and electrically resistive properties; and generating at the temperature sensor and communicating to the processing circuit a signal representative of the cold junction temperature;

wherein the processing circuit is adapted for receiving and analyzing the signals from the pair of contacts and from the temperature sensor to provide a cold junction compensated temperature reading.

13. The method of claim 12, further comprising:
sealing the cold junction temperature sensor from ambient.

14. The method of claim 12, wherein the pair of contacts have a thermal time constant of equal to or less than about one minute.

15. A temperature measurement device, comprising:
a housing;
a processing circuit;
an input and output interface; and
a cold junction compensation system, the cold junction compensation system comprising:
a cold junction temperature sensor arranged in signal communication with the processing circuit;
a thermal coupler in thermal communications with the cold junction temperature sensor;
a first and a second contact each in thermal communication with the thermal coupler and in electrical isolation with each other, each contact arranged in signal communication with the processing circuit and arranged for signal communication with a hot junction temperature sensor;
a substrate for supporting the cold junction temperature sensor, the cold junction temperature sensor being disposed between the substrate and the thermal coupler;
wherein a signal from the hot junction temperature sensor is communicated to the processing circuit via the first and second contacts, the cold junction temperature sensor senses the cold junction temperature at the first and second contacts via the thermal coupler, and a signal representative of the cold junction temperature is communicated to the processing circuit for enabling a cold junction compensation calculation.

16. The device of claim 15, wherein:
the thermal coupler comprises an elastomeric material having thermally conductive properties and electrically resistive properties; and
the thermal coupler is disposed to provide a seal to enclose the cold junction temperature sensor between the thermal coupler and the substrate.

17. The device of claim 16, wherein the first and second contacts each have a weight of equal to or less than about 1 gram.

* * * * *